US006818577B2

(12) United States Patent
Anma et al.

(10) Patent No.: US 6,818,577 B2
(45) Date of Patent: Nov. 16, 2004

(54) OPTICAL WAVEGUIDE ELEMENT AND METHOD FOR PREPARATION THEREOF

(75) Inventors: Yasuhiro Anma, Tokyo (JP); Tomoyuki Hayashi, Tokyo (JP); Junko Ishizu, Tokyo (JP); Tatsushi Kunou, Tokyo (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/204,155

(22) PCT Filed: Jan. 18, 2002

(86) PCT No.: PCT/JP02/00322

§ 371 (c)(1),
(2), (4) Date: Nov. 20, 2002

(87) PCT Pub. No.: WO02/061475

PCT Pub. Date: Aug. 8, 2002

(65) Prior Publication Data

US 2003/0144125 A1 Jul. 31, 2003

(51) Int. Cl.⁷ ............................................. C03C 3/091
(52) U.S. Cl. ............................. 501/66; 501/67; 501/65
(58) Field of Search .............................. 501/65, 66, 67

(56) References Cited

U.S. PATENT DOCUMENTS

| | | | | |
|---|---|---|---|---|
| 3,649,311 A | * | 3/1972 | Araujo | 501/56 |
| 4,160,654 A | * | 7/1979 | Bartholomew et al. | 65/30.13 |
| 4,562,161 A | * | 12/1985 | Mennemann et al. | 501/59 |
| 4,792,535 A | * | 12/1988 | Fine | 501/66 |
| 4,894,303 A | * | 1/1990 | Wu | 430/13 |
| 4,902,426 A | * | 2/1990 | Macedo et al. | 210/656 |
| 5,004,707 A | * | 4/1991 | Ross et al. | 501/37 |
| 5,007,948 A | * | 4/1991 | Araujo | 65/30.13 |
| 5,114,453 A | * | 5/1992 | Ross et al. | 65/30.13 |
| 5,114,813 A | * | 5/1992 | Smoot et al. | 430/5 |
| 5,145,757 A | * | 9/1992 | Smoot et al. | 430/5 |
| 5,790,729 A | * | 8/1998 | Pologe et al. | 385/46 |

FOREIGN PATENT DOCUMENTS

| | | | |
|---|---|---|---|
| GB | 2170797 A | 1/1986 | |
| JP | 8-86927 A | 4/1996 | |
| JP | 2001-133649 A | 5/2001 | |
| SU | 550349 A | * 4/1977 | C03C/3/08 |

OTHER PUBLICATIONS

Machine Translation of JP 08–086927.*
Machine Translation of JP 2001–133649.*
Derwent Abstract 1977–86114Y of SU 550349.*
G.A.C.M. Splerings et. al., Journal of Non–Crystalline Solids, vol. 113 No. 1 (Nov. 2, 1989) pp. 37–40.
D. Bougaud et. al., Ionics, Vol.25 (1999) pp. 415–420.
B. Messersycnidt et. al., Optical Materials, vol. 7 No. 4 (May 1997) pp. 165–171.
S. A. Poling et. al., Journal of Non–Crystalline Solids, vol. 272 No. 1 (Jul. 2, 2000) pp. 39–45.
T. Prosner et. al., Glastechnische Berichte, vol. 64 No. 7 (Jul. 1991) pp. 186–190.
Ludwig Roβ, "Integrated optical components in substrate glasses", Review Paper, pp. 285–297, Glastech. Ber. 62 (1989) Nr. 8.
T. Findakly, "Glass waveguides by ion exchange: a review" Optical Engineering, 1985, vol. 24 No. 2, pp. 244–250.

* cited by examiner

*Primary Examiner*—Karl Group
*Assistant Examiner*—Elizabeth A. Bolden
(74) *Attorney, Agent, or Firm*—Martin Fleit; Paul D. Bianco; Fleit, Kain, Gibbons, Gutman, Bongini & Bianco

(57) ABSTRACT

An optical waveguide element that can stably and inexpensively form an optical waveguide of low loss and low stress in a glass material by ion exchange of Ag ions, and to provide a process for producing the same are provided. The optical waveguide element is made of a multicomponent glass material, which is $Na_2O$—$B_2O_3$—$Al_2O_3$—$SiO_2$ glass containing from 5 to 13% by mole of $Na_2O$, in which an optical waveguide is formed by doping with Ag ions by ion exchange. The composition is preferably $SiO_2$: 60 to 75% by mole, $B_2O_3$: 10 to 20% by mole, $Al_2O_3$: 2 to 10% by mole, $Na_2O$: 5 to 13% by mole, $Li_2O$: 0 to 1% by mole, $As_2O_3$: 0 to 0.5% by mole, and $Sb_2O_3$: 0 to 0.5% by mole (provided that $As_2O_3+Sb_2O_3$: 0.01 to 1% mole).

7 Claims, No Drawings

OPTICAL WAVEGUIDE ELEMENT AND METHOD FOR PREPARATION THEREOF

BACKGROUND OF THE INVENTION

1. Field of the Invention

The present invention relates to an optical waveguide element having an optical waveguide formed by doping a glass material with Ag ions by an ion exchange method, and a process for producing the same.

2. Background Art

A technique for forming an optical waveguide in a glass substrate by an ion exchange method has been known as an optical waveguide element and a process for producing the same. A technique for ion-exchanging Na ions in a glass material by using Ag ions has also been reported.

The Ag-Na ion exchange not only provides a large change in refractive index to form an optical waveguide having a low birefringence, but also provides such an advantage that the exchange rate is large to obtain high productivity. However, such problems have been pointed out that a birefringence occurs by ion exchange of alkali metal ions other than Na ions, and coloring and absorption occur due to formation of an Ag colloid.

In order to form an optical waveguide of low loss and low stress by ion exchange of Ag ions, it has been proposed to use, as a glass material, F-substituted (fluorine-substituted) glass or glass having a small amount of non-bridging oxygen (see JP-A-4-219341).

The F-substituted glass has an advantage that the glass is melted at a lower temperature, and the refractive index is lowered, but is conspicuous in nonuniformity due to fluorine exhibiting high volatility, and thus such problems occur that the productivity of the glass is poor, and a diameter of a substrate (wafer) cannot be increased.

The glass having a small amount of non-bridging oxygen thus proposed not only contains a large amount of an alkali component (about 20% by mole or more) while the amount of a volatile component is not so large, whereby the weather resistance is poor, but also has a high refractive index, and thus mode field matching with an optical fiber is difficult. Furthermore, it also brings about increase of a reflective light amount at a jointed part of the optical waveguide and the optical fiber. Moreover, the use of an additive is noted in the foregoing patent publication in order to avoid coloration, and accordingly, the increase in refractive index thereby cannot be avoided.

Upon practical production of an optical waveguide by ion exchange, such material design is necessary that the ion exchange rate and the embedding controllability are considered. However, there is no sufficient description about it in the patent publications and literatures that are currently known, the relationship among the coloration, the productivity and the composition has not yet been elucidated.

SUMMARY OF THE INVENTION

An object of the invention is to provide an optical waveguide element that can stably and inexpensively form an optical waveguide of low loss and low stress in a glass material by ion exchange of Ag ions, and to provide a process for producing the same.

The invention provides an optical waveguide element comprising a multicomponent glass material, which is $Na_2O$—$B_2O_3$—$Al_2O_3$—$SiO_2$ glass containing from 5 to 13% by mole of $Na_2O$, in which an optical waveguide is formed by doping with Ag ions by ion exchange.

The multicomponent glass preferably is that having a composition containing:
$SiO_2$: 60 to 75% by mole,
$B_2O_3$: 10 to 20% by mole,
$Al_2O_3$: 2 to 10% by mole,
$Na_2O$: 5 to 13% by mole,
$Li_2O$: 0 to 1% by mole,
$As_2O_3$: 0 to 0.5% by mole, and
$Sb_2O_3$: 0 to 0.5% by mole
(provided that $As_2O_3+Sb_2O_3$: 0.01 to 1% mole).

The composition of the multicomponent glass material is more preferably composed of:
$SiO_2$: 63 to 72% by mole,
$B_2O_3$: 10 to 18% by mole,
$Al_2O_3$: 2 to 8% by mole,
$Na_2O$: 7 to 13% by mole,
$Li_2O$: 0 to 1% by mole,
$As_2O_3$: 0 to 0.5% by mole, and
$Sb_2O_3$: 0 to 0.5% by mole
(provided that $As_2O_3+Sb_2O_3$: 0.01 to 1% mole).

It is desired that the glass material has a refractive index of 1.50 or less with respect to a near infrared ray having a wavelength of from 1,200 to 1,650 nm under consideration that the purpose thereof is optical communication. It is also desired that the glass material used in the present invention is in a substrate form having a thickness of 5 mm or less, at least one surface of which is in a state of a mirror surface having a surface roughness Ra of from 0.001 to 0.1 $\mu$m.

The optical waveguide formed in the glass material may be formed on the surface of the glass material, but such a structure is preferred that the Ag ion doping region is embedded within the glass material.

Upon producing the optical waveguide element, the ion exchange of Ag ions is carried out, for example, at 200 to 350° C. with a processing bath containing Ag ions.

In order to form an optical waveguide in the glass material, what are important are a. change in refractive index that is sufficient for single mode waveguide,
b. low birefringence,
c. low absorption characteristics,
d. excellent weather resistance,
e. high productivity (the yield of the glass wafer and the conditions for forming the optical waveguide), and
f. low-loss joint to an optical fiber(matching with the optical fiber).

The high productivity of the item (5) relates to the ion exchange rate, and the low-loss joint property of the item (6) relates to the matching in refractive index. Therefore, such a compositional design is necessary that the characteristics of the glass components considered.

The glass used in the invention is glass of $Na_2O$—$B_2O_3$—$Al_2O_3$—$SiO_2$ system. The functions exerted by the respective components are as follows, and according thereto, it is preferred that the compositional proportions are determined as follows.

$SiO_2$ is a main component forming a glass network, and the glass is chemically unstable with poor water-resistance and acid-resistance when it is of a low concentration, but the melting temperature thereof is increased when it is of a high concentration. Therefore, it is preferably from 60 to 75% by mole, and more preferably from 63 to 72% by mole.

$B_2O_3$ forms the glass network and lowers the melting temperature and the forming temperature of the glass, and therefore, it is necessarily contained. The effect of lowering the melting temperature becomes poor when it is of a low concentration, and when it is of a high concentration, it is liable to be vaporized upon forming, whereby such defects as cord and devitrification occur due to compositional fluctuation. Therefore, it is preferably from 10 to 20% by mole, and more preferably from 10 to 18% by mole.

$Al_2O_3$ chemically stabilizes the glass and accelerates the ion exchange. When it is of a low concentration, the effect of accelerating the ion exchange is poor, and when it is of a high concentration, the melting temperature of the glass is increased, and the glass is liable to devitrify. Therefore, it is preferably from 2 to 10% by mole, and more preferably from 2 to 8% by mole.

$Na_2O$ is necessarily contained in a certain amount or more in order to cause change of the refractive index of the glass by exchange with Ag ions. However, because the durability of the glass is decreased (it is difficult to be vitrified) and the refractive index is increased when it is of a high concentration, it is made as small as possible. Therefore, it is preferably from 5 to 13% by mole, and more preferably from 7 to 13% by mole. $Li_2O$ is expensive while it improves the melting property (moldability) of the glass. Even when it is of a high concentration, no further improvement in melting property is obtained, and exchange with Ag ions occurs. Therefore, it preferably is 1% by mole or less, and it may not be contained.

In addition to the foregoing basic components, a clarificant and the like may be added in such a range that does not impair the gist of the invention. For example, $As_2O_3$: 0 to 0.5% by mole, and
$Sb_2O_3$: 0 to 0.5% by mole, provided that $As_2O_3+Sb_2O_3$: 0.01 to 1% mole, are added. These exert such a function that bubbles are liable to be removed (defoaming function).

As described in the foregoing, the low birefringence is necessarily realized in an optical waveguide element, and on that account, it is important to suppress alkali metal ions other than Na ions since they causes stress by exchange with Ag ions. In the invention, K ions is not contained as a glass component.

DETAILED DESCRIPTION OF PREFERRED EMBODIMENTS BEST MODE FOR CARRYING OUT THE INVENTION

Substrates were experimentally prepared with the glass materials of various kinds compositions shown in Table 1, and after subjected to an ion exchange treatment, necessary measurements were carried out.

TABLE 1

| | Invention | | | | | Comparative Example | | | | |
|---|---|---|---|---|---|---|---|---|---|---|
| Sample No. | 1 | 2 | 3 | 4 | 5 | 6 | 7 | 8 | 9 | 10 |
| Composition (% by mole) | | | | | | | | | | |
| $SiO_2$ | 67.4 | 69.4 | 71.4 | 68.4 | 71.9 | 62.4 | 67 | 67.4 | 61.4 | 75 |
| $B_2O_3$ | 15 | 15 | 15 | 14 | 11 | 15 | 0 | 15 | 15 | 16.4 |
| $Al_2O_3$ | 7 | 5 | 3 | 4.5 | 5 | 12 | 17.4 | 7 | 8 | 5 |
| $Na_2O$ | 10 | 10 | 10 | 12.5 | 11.5 | 10 | 15 | 7 | 15 | 3 |
| $Li_2O$ | 0.5 | 0.5 | 0.5 | 0.5 | 0.5 | 0.5 | 0.5 | 0.5 | 0.5 | 0.5 |
| $K_2O$ | 0 | 0 | 0 | 0 | 0 | 0 | 0 | 3 | 0 | 0 |
| $Sb_2O_3$ | 0.1 | 0.1 | 0.1 | 0.1 | 0.1 | 0.1 | 0.1 | 0.1 | 0.1 | 0.1 |
| Ion exchange temperature (° C.) | 280 | 280 | 280 | 280 | 280 | 280 | 280 | 280 | 280 | 280 |
| Ion exchange concentration (% by mole) | 3 | 3 | 3 | 3 | 3 | 3 | 3 | 3 | 3 | 3 |
| Ion exchange rate ($\mu m^2$/min) | 0.15 | 0.09 | 0.08 | 0.13 | 0.18 | 0.14 | 4.58 | 0.13 | 0.25 | 0.05 |
| Refractive index ($\lambda$ = 1,550 nm) | 1.4797 | 1.4880 | 1.4815 | 1.4947 | 1.4893 | 1.4796 | 1.4914 | 1.4785 | 1.5035 | 1.4750 |
| Change in refractive index | 0.013 | 0.014 | 0.014 | 0.04 | 0.022 | 0.010 | 0.081 | 0.015 | 0.045 | 0.006 |
| Coloration | None | none | none | none | none | None | present | none | none | none |
| Birefringence | Low | low | low | low | low | Low | low | high | low | low |
| Melting temperature (° C.) | 1,500 | 1,500 | 1,470 | 1,450 | 1,450 | 1,600 | 1,600 | 1,500 | 1,450 | 1,500 |

Glass raw materials were blended to make the compositions shown in Table 1, and they were melted in a platinum crucible, and after molding, were slowly cooled to produce samples. After worked into a wafer substrate form, the sample glass substrate was immersed in a 3% by mole silver nitrate ($AgNO_3$) molten salt (temperature: 280° C.) for 5 hours to exert ion exchange, and then the ion exchange rate, the change in refractive index, coloration characteristics (absorption characteristics) and birefringence were evaluated. The refractive index of the substrate glass and the melting temperature required for homogenization of the glass were also measured.

The sample Nos. 1 to 5 were glass compositions within the scope of the invention, and the sample Nos. 6 to 10 were glass compositions outside the scope of the invention (comparative examples). All species of the glass of sample Nos. 1 to 5 had change amounts of refractive index that were sufficient for single mode design, and they were transparent and had low birefringence. They had low refractive indexes of the glass substrates, and the melting temperatures thereof were relatively low as 1,500° C. or less to form homogeneous glass. On the other hand, the species of glass of sample Nos. 6 and 7 required high temperature melting due to the large amounts of $Al_2O_3$, and it was difficult to prepare homogeneous glass. The glass of sample No. 7, which was only one kind of glass that did not contain $B_2O_3$, caused coloration. Sample No. 8 exhibited birefringence because $K_2O$ was contained as an oxide of an alkali metal. The glass of sample No. 9 had a high refractive index owing to the excess amount of alkali, and thus matching with an optical fiber was difficult. The glass of sample No. 10 had a small change amount in refractive index owing to a too small amount of alkali, and had such a disadvantage that single mode design was infeasible.

While not particularly exemplified, the invention can be applied to optical waveguide elements of various structures that have optical waveguides in glass substrates, and thus can be applied not only to various kinds of passive optical planar circuits, but also to part of optical integrated circuits having an active part, and it goes without saying that all the cases are encompassed by the invention.

According to the invention, an optical waveguide of low loss an low stress can be formed by ion exchange of Ag ions in glass capable of producing substrates of a large diameter. That is, such change in refractive index is caused that is sufficient for single mode waveguide, low birefringence and low absorption characteristics are obtained, excellent weather resistance is exhibited, high productivity is obtained, and low loss joint with an optical fiber is realized.

What is claimed is:

1. An optical waveguide element comprising a multicomponent glass material formed of $Na_2O$—$B_2O_3$—$Al_2O_3$—$SiO_2$ glass, comprising:

$SiO_2$: 60 to 75% by mole,
    $B_2O_3$: 10 to 20% by mole,
    $Al_2O_3$: 2 to 10% by mole,
    $Na_2O$: 5 to 13% by mole,
    $As_2O_3$: 0 to 0.5% by mole, and
    $Sb_2O_3$: 0 to 0.5% by mole provided that $Li_2O$ is greater than 0% and less than 1% by mole, and $As_2O_3+Sb_2O_3$: 0.01 to 1% mole, wherein the multicomponent glass material is doped with Ag ions by ion exchange to form an optical waveguide.

2. An optical waveguide element comprising a multicomponent glass material formed of $Na_2O$—$B_2O_3$—$Al_2O_3$—$SiO_2$ glass, comprising:

$SiO_2$: 63 to 72% by mole,
    $B_2O_3$: 10 to 18% by mole,
    $Al_2O_3$: 2 to 8% by mole,
    $Na_2O$: 7 to 13% by mole,
    $As_2O_3$: 0 to 0.5% by mole, and
    $Sb_2O_3$: 0 to 0.5% by mole provided that $Li_2O$ is greater than 0% and less than 1% by mole, and $As_2O_3+Sb_2O_3$: 0.01 to 1% mole, wherein the multicomponent glass material is doped with Ag ions by ion exchange to form an optical waveguide.

3. An optical waveguide element as described in claim 1, wherein the glass material has a refractive index of 1.50 or less with respect to a near infrared ray having a wavelength of from 1,200 to 1,650 nm.

4. An optical waveguide element as described in claim 1, wherein the glass material is in a substrate form having a thickness of 5 mm or less, at least one surface of which is in a state of a mirror surface having a surface roughness Ra of from 0.001 to 0.1 $\mu$m.

5. An optical waveguide element as described in claim 1, wherein an Ag ion doping region is embedded within the glass material.

6. A process for producing an optical waveguide element as described in claim 1, comprising carrying out ion exchange of Ag ions at 200 to 350° C.

7. A process for producing an optical waveguide element as described in claim 6, wherein the ion exchange is carried out with a processing bath containing Ag ions.

* * * * *